(12) United States Patent
Kamphuis et al.

(10) Patent No.: US 7,914,058 B2
(45) Date of Patent: Mar. 29, 2011

(54) PICKING APPARATUS FOR AN ELECTRONIC DEVICE

(75) Inventors: Eduard Hendrik Jan Kamphuis, Oberanven (LU); Anthony William Parsons, Domeldange (LU); Robert Edward Lionetti, Bereldange (LU)

(73) Assignee: The Goodyear Tire & Rubber Company, Akron, OH (US)

( * ) Notice: Subject to any disclaimer, the term of this patent is extended or adjusted under 35 U.S.C. 154(b) by 1135 days.

(21) Appl. No.: 11/640,607

(22) Filed: Dec. 18, 2006

(65) Prior Publication Data

US 2008/0145188 A1    Jun. 19, 2008

(51) Int. Cl.
*B25J 15/06* (2006.01)
*G08B 23/00* (2006.01)
(52) U.S. Cl. .................................. 294/65.5; 156/272.2
(58) Field of Classification Search ................ 294/65.5; 414/14; 340/500; 156/272.2
See application file for complete search history.

(56) References Cited

U.S. PATENT DOCUMENTS

| | | | | |
|---|---|---|---|---|
| 4,827,956 A | * | 5/1989 | Toot | 294/65.5 |
| 5,169,482 A | * | 12/1992 | Bottcher | 156/405.1 |
| 5,429,402 A | * | 7/1995 | Kennedy | 294/65.5 |
| 5,799,999 A | * | 9/1998 | Schneider et al. | 294/65.5 |
| 6,056,339 A | * | 5/2000 | Berger | 294/65.5 |
| 6,355,126 B1 | * | 3/2002 | Ogawa | 156/117 |
| 6,630,910 B2 | * | 10/2003 | Forster et al. | 343/806 |
| 7,767,052 B2 | * | 8/2010 | Kamphuis et al. | 156/272.2 |

* cited by examiner

*Primary Examiner* — Paul T Chin
(74) *Attorney, Agent, or Firm* — Richard B. O'Planick

(57) ABSTRACT

Picking apparatus for handling an electronic device having an elongate dipole antenna includes: a support body having an open slot defined by guide fingers; and an antenna positioning mechanism such as a magnet positioned to move the antenna into the slot and holding the antenna within the slot in an elongate condition. The magnet may be switched to an off condition to release the antenna from the slot or mechanically overcome. An apparatus push rod actuator may be deployed to move the antenna from the slot and deposit the antenna on a receiving component surface external of the slot.

18 Claims, 5 Drawing Sheets

PICKING APPARATUS FOR AN ELECTRONIC DEVICE

FIELD OF THE INVENTION

The invention relates generally to apparatus for handling an electronic device and, more specifically, to picking apparatus for picking and transporting an RFID tag having a dipole helically wound antenna.

BACKGROUND OF THE INVENTION

RFID tags are electronic devices increasingly used in various commercial applications as a means for identifying articles of manufacture. Typically, a tag includes an electronic transmitter for transmitting an identification signal by means of an antenna. The tag may be embedded within or otherwise attached to a product or article of manufacture and functions to communicate a unique identification signal to a remote receiver or reader. Tires are one product category in which such devices are employed. An RFID tag within a tire can identify the tire manufacturer, date of manufacturer, etc. as well as store and transmit data relating to the vehicle upon which the tire was originally mounted.

At ultra high frequency (UHF), a radio frequency identification (RFID) tag may utilize a dipole helically wound steel wire antenna. Such a configuration presents myriad manufacturing and handling challenges in the incorporation of the RFID tag into a product such as a tire. The dipole antennas tend to nest and tangle if the tags are not kept segregated. The packaging used to transport tags may not be sufficient to contain the wildness of the antenna coil during transportation. In addition, when such a tag is removed from the package, the antenna may bow with a certain cast, thereby affecting antenna performance characteristics.

In order to ensure proper tag performance, the dipole antenna must be kept as straight as possible when embedding it in or on the product to which it is to be affixed. For example, in a tire application, the antenna must be maintained in a straight condition when embedded within a rubber compound that will eventually be vulcanized. The straightness of the antenna will directly influence the tag's performance since any variation will change the tuned length. The relatively small size of the tag exacerbates the challenges in achieving an acceptable handling and transport apparatus, particularly if such tags are picked from a bin or tray and incorporated into a remotely positioned product or component during manufacture.

Within the industry currently, manual methods are employed to handle tags. Antenna are placed by hand on gum strips and manually straightened before applying a covering strip. Such a procedure is susceptible to human error and inaccuracy and, while representing an option, does not meet all of the needs of the industry.

Heretofore, no effective apparatus has been attained that can safely, expediently, and in a cost effective manner handle and transport RFID tags having a dipole helically wound antenna. An apparatus of the type desired within the industry should be capable of handling a tag individually and further be capable of picking a tag from a bin or tray and depositing the tag into or on a distanced product or component during manufacture. The apparatus should further function to maintain the elongation of the antenna at its designed configuration between the picking and placement stages of the manufacturing procedure.

SUMMARY OF THE INVENTION

According to one aspect of the invention, apparatus for handling an electronic device of the type having an elongate dipole antenna is provided comprising: a support body having an open slot defined by at least one guide finger; and a magnet positioned within the slot for attracting the antenna into the slot and holding the antenna within the slot in an elongate condition. The magnet may be switched to an off condition or mechanically overridden to release the antenna from the slot.

In another aspect, an actuator is provided for engaging and pushing the antenna from the slot. The actuator may include a reciprocating push rod disposed to axially move a rod end into engagement with the antenna and push the antenna within the slot. The push rod may be calibrated to push the antenna a sufficient distance clear of the slot and deposit the antenna on a receiving component external of the slot.

A further aspect of the invention utilizes a pair of guide fingers defining the open slot, the guide fingers converging from an open slot end to a relatively narrower slot portion. A magnet within the slot attracts the antenna from the open slot end to the narrower slot portion. Yet another aspect utilizes at least two slots, each defined by a respective pair of guide fingers, the slots being aligned and each receiving a respective end of the dipole antenna therein to capture and maintain the dipole antenna ends in a substantially co-linear orientation. Each slot has a magnet positioned therein to attract the respective antenna end into the slot and an associate push rod for pushing the respective antenna end from the slot.

In yet another aspect of the invention, alternative means for drawing the antenna ends into slots may be employed, such as a vacuum. The vacuum may be removed to release the antenna ends and allow for withdrawal of the antenna ends from the slots.

BRIEF DESCRIPTION OF THE DRAWINGS

The invention will be described by way of example and with reference to the accompanying drawings in which.

DETAILED DESCRIPTION OF THE INVENTION

Figure 1:
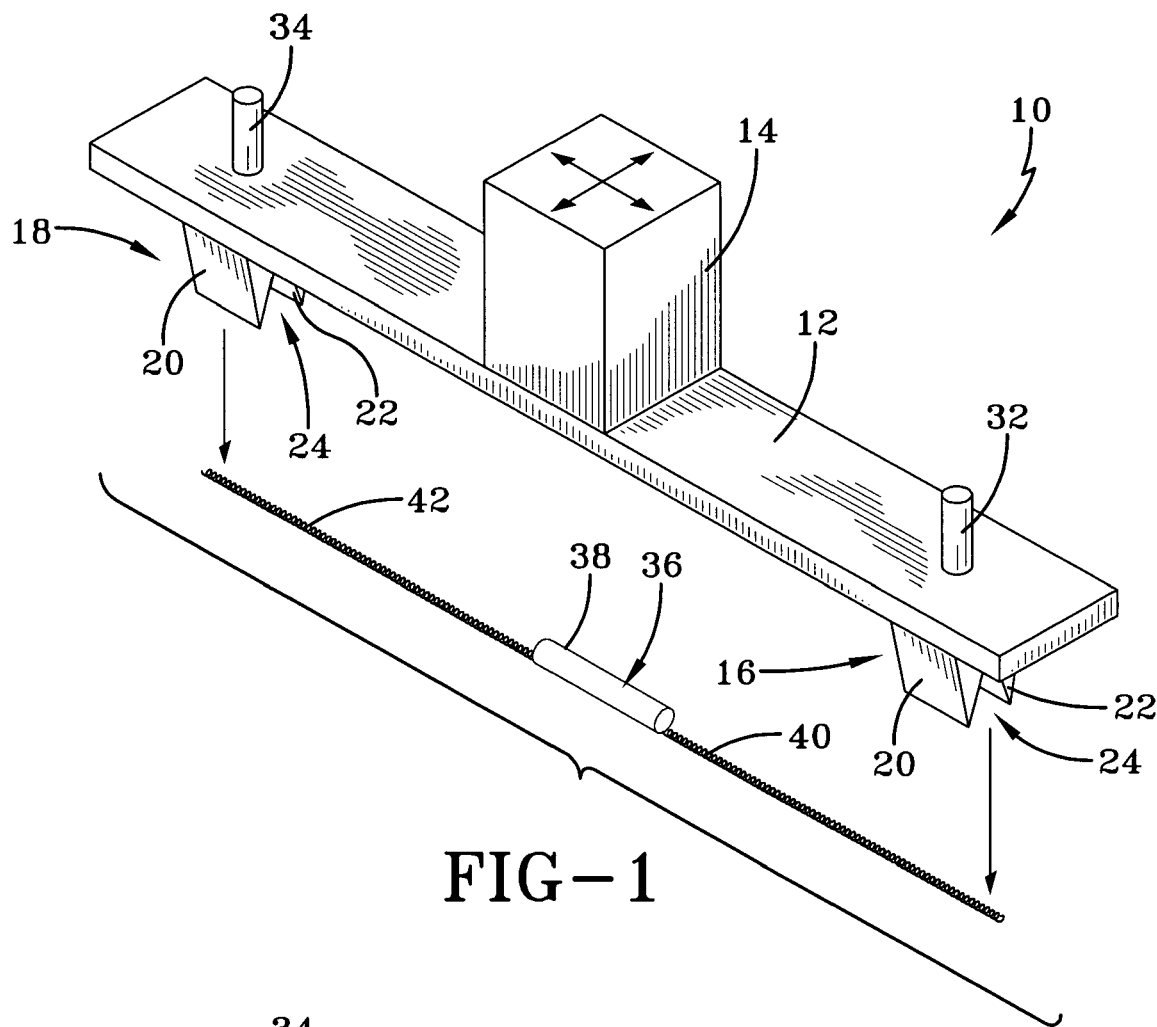
FIG. 1 is an exploded perspective view of the RFID handling apparatus operatively aligned with an RFID device.
Figure 2:
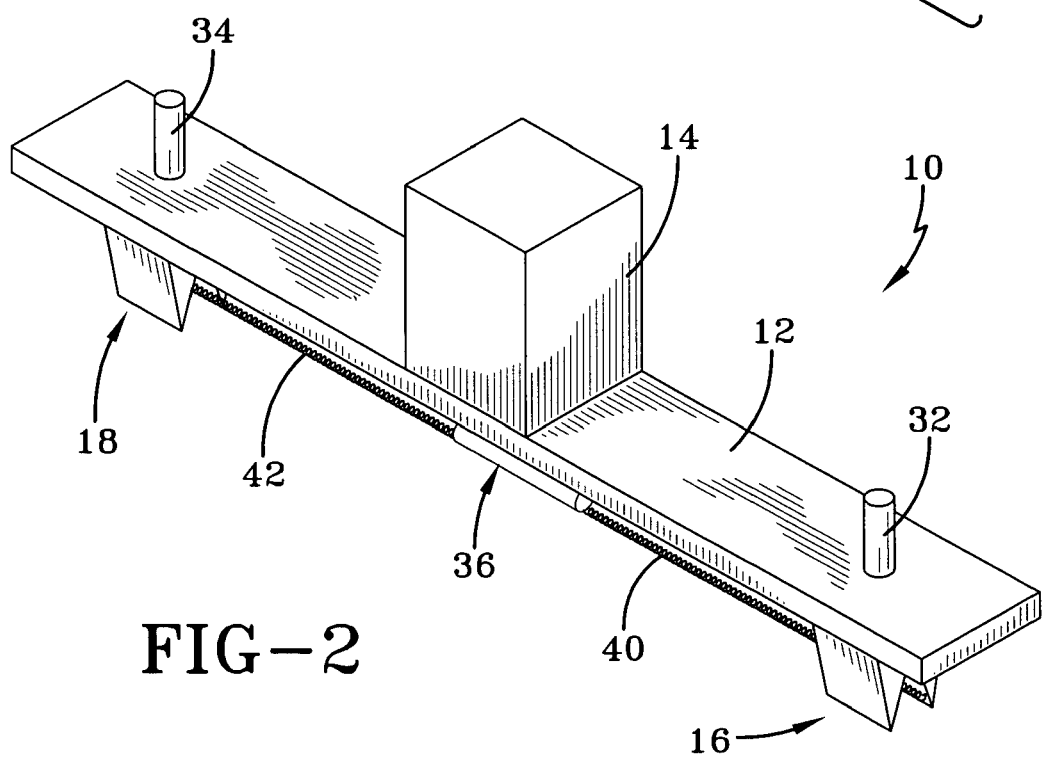
FIG. 2 is a perspective view of the RFID handling apparatus shown with the RFID device antenna positioned within apparatus slots.
Figure 3:
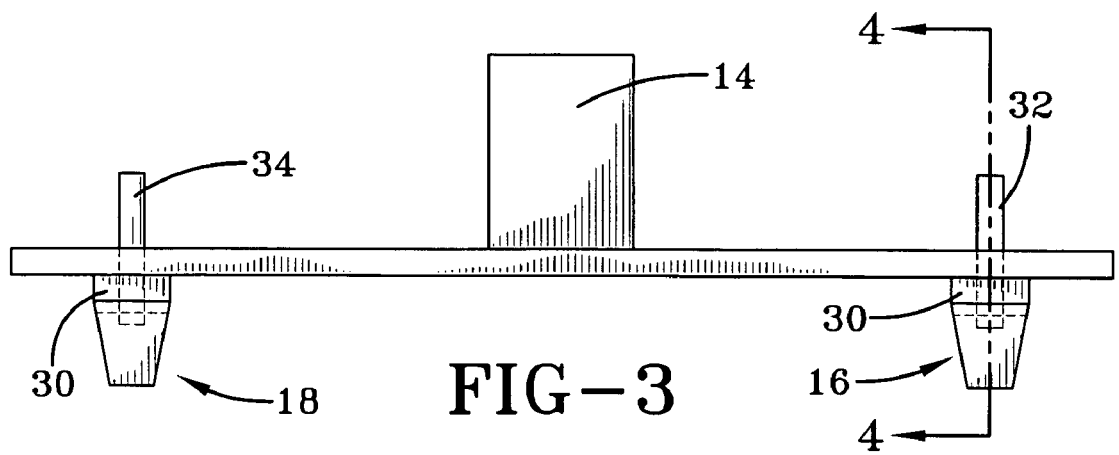
FIG. 3 is a side elevation view thereof shown in partial section of the RFID handling apparatus.
Figure 4:
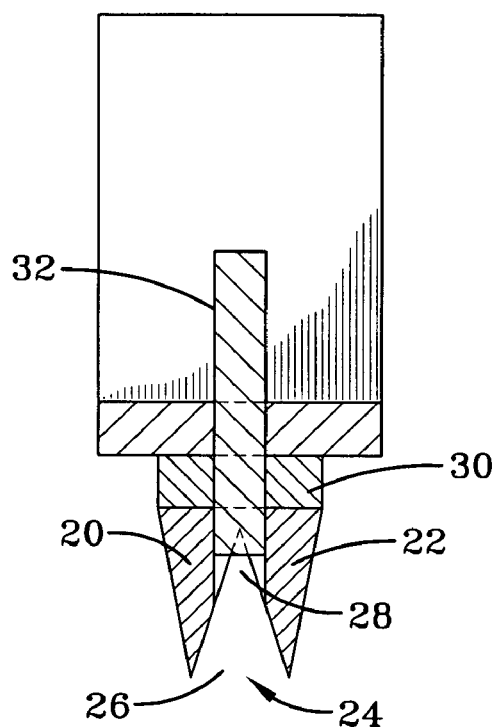
FIG. 4 is an end elevation view of the RFID handling apparatus.
Figure 5:
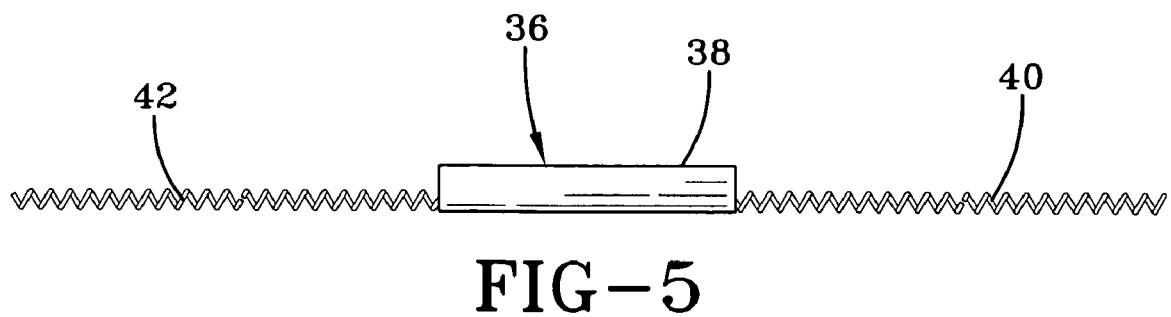
FIG. 5 is an enlarged side elevation view of a representative RFID tag.

Referring initially to FIGS. 1-5, an electronic device handling apparatus 10 is shown that functions to pick and place an electronic device 36 such as an RFID tag in a desired location. RFID tags such as that depicted are of a type having a dipole helically wound steel wire antenna. Electronic transmitter and data storage 38 communicate a unique identification signal to an outside receiver by means of ultra high frequency (UHF) radio frequency. The antenna extends ends 40, 42 outward in linear fashion from the transmitter device 36 and is of a tuned length. Accordingly, it is desirable to maintain the straightness of the antenna during handling, transport, and application to a product since a compromise of the antenna configuration will directly influence tag performance.

The apparatus includes a support body 12 having a manipulation protrusion 14 extending therefrom for use in moving the body 12 from location to location. While shown in a detached illustration in FIGS. 1-5, the apparatus 10 is susceptible for incorporation into automated equipment including robotics. Such automated equipment (not shown) may function to relocate the body 12 pursuant to computer controlled instruction.

The apparatus 10 further includes dual guide components 16, 18, each having spaced apart guide fingers 20, 22. The guide fingers 22, 24 define therebetween a tapering slot 24 that narrows from an open wider slot end 26 inward to a narrower slot end 28. While two slots are shown in the illustrated embodiment, more or fewer pairs of slot fingers may be employed as desired. Situated within the narrow end 28 of each slot is a magnet 30. Magnet 30 may be an electromagnet or a permanent magnet. Associate switching circuitry common to the use of magnets 30 is provided to switch the magnets 30 between on and off conditions. Alternative means may be used if desired with or in place of the magnets 30. For example, without intent to delimit the invention, a vacuum system may be used to draw antenna ends into the slots 24. Also situated within each slot 24 respectively are push rods 32, 34. Push rods 32, 34 are mounted through the support body 12 and reciprocally move in an axial direction within each slot 24. Accordingly, the push rod ends within the slots 24 move reciprocally toward and away from the wider end of a respective slot 24.

As discussed, an RFID tag having a dipole helically wound steel wire antenna is the target of apparatus 10. The wire antenna ends 40, 42 extend from the transmitting and data storage electronics 38 in a generally co-axial arrangement. The tag 36 may be one of many tags in a bin or other storage medium. So situated, tags 36 tend to nest and tangle and may not be in a readily accessible orientation. The invention is intended to pick an individual tag 36 from such an environment and transport the picked tag to a final or intermediate destination. In the case of an RFID tag incorporated within a tire, for example, the tag may be picked and placed on green rubber components. FIGS. 6D-6F illustrate such a target tag receiving body 44 having a surface 46 on which the tag is intended to be deposited.

Figure 6A:
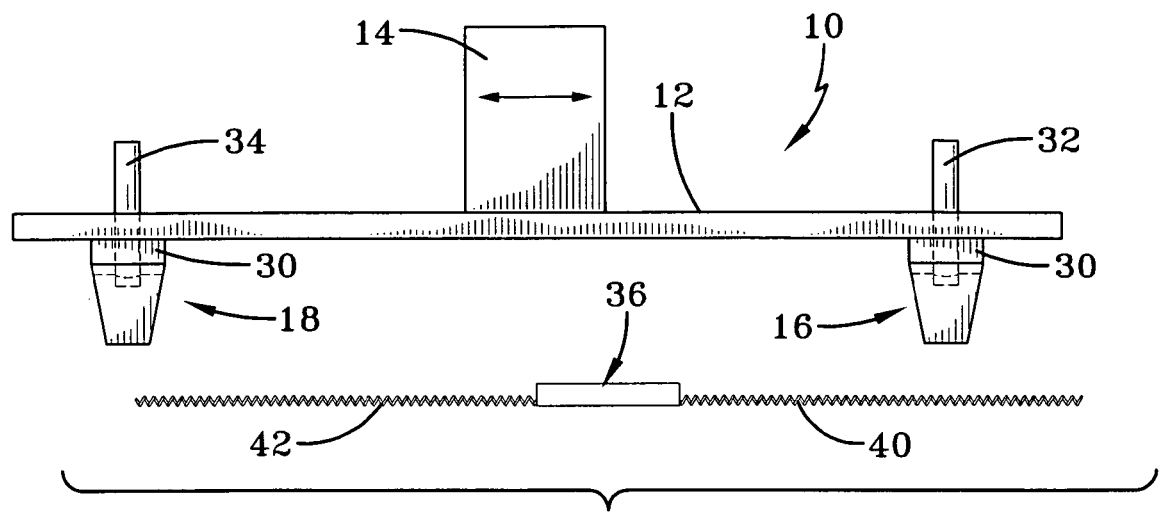
FIG. 6A is a side elevation view of the RFID handling apparatus operatively aligned with an RFID device.
Figure 6B:
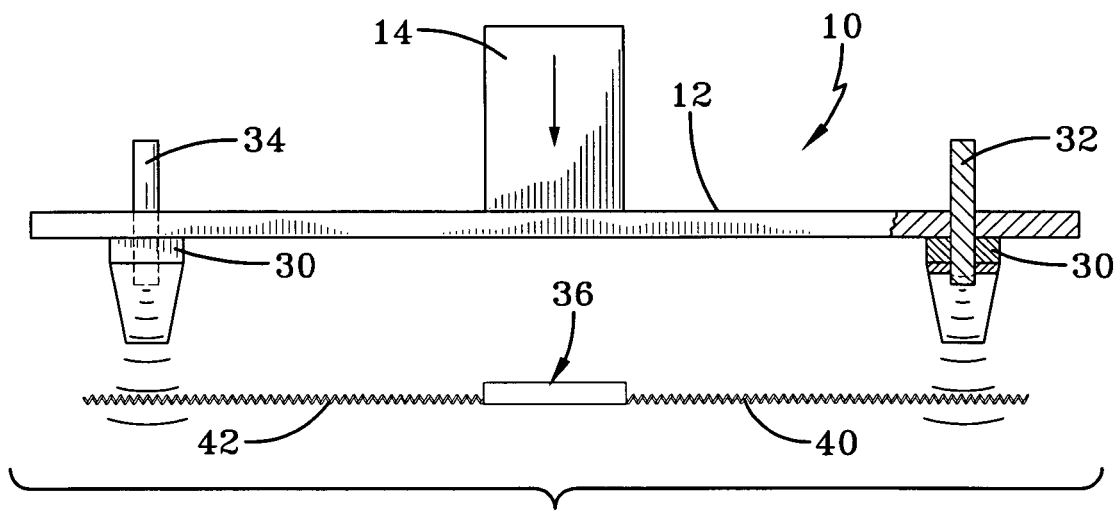
FIG. 6B is a sequential view thereof showing actuation of electromagnets within the RFID apparatus slots.
Figure 6C:
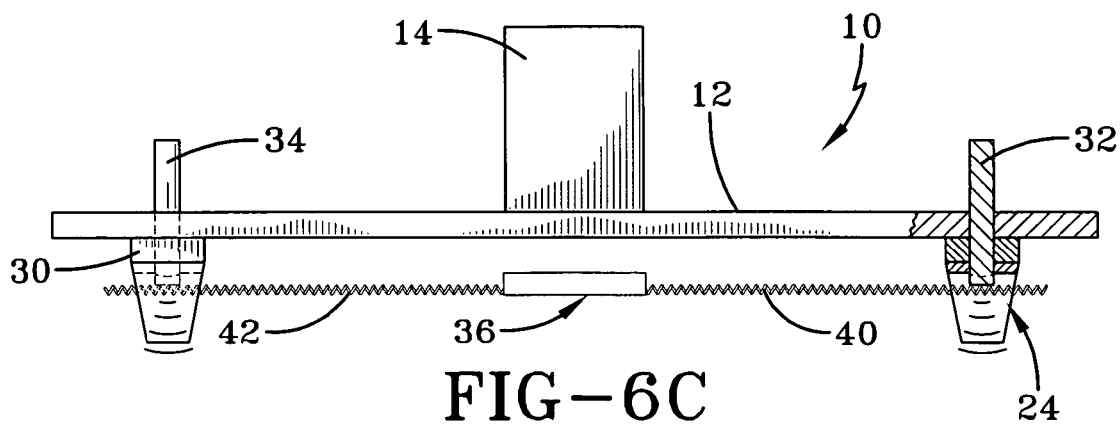
FIG. 6C is a subsequent sequential view of the RFID antenna ends being drawing into the RFID apparatus slots.
Figure 6D:
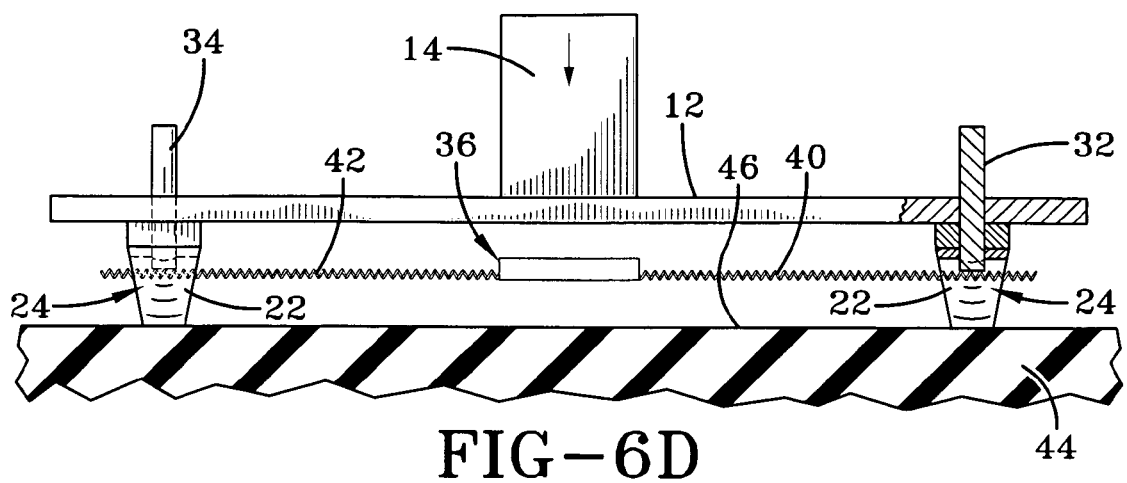
FIG. 6D is a subsequent sequential view of the RFID device and apparatus disposed against an external receiving surface.
Figure 6E:
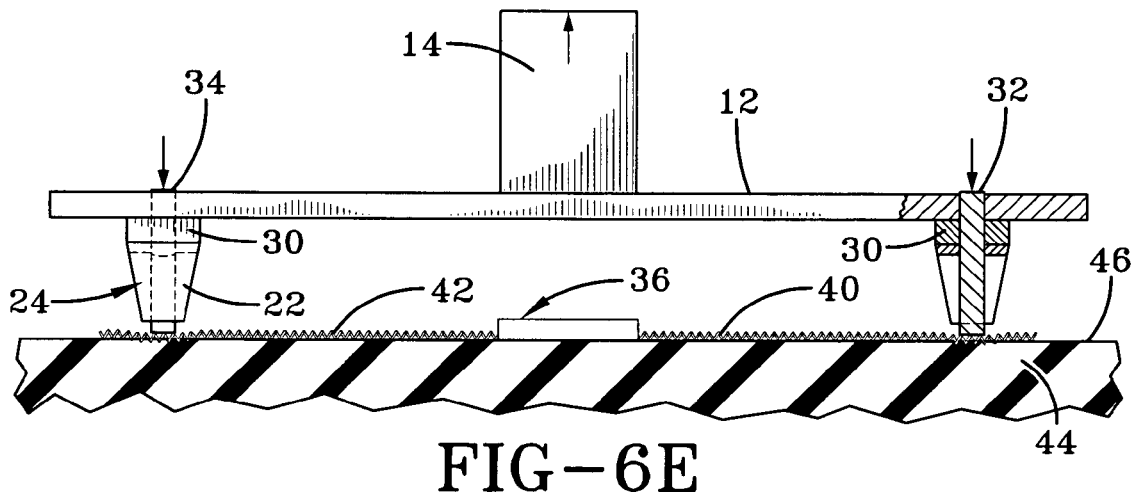
FIG. 6E is a subsequent sequential view of actuating push rods pushing antenna ends from the apparatus slots against the receiving surface.
Figure 6F:
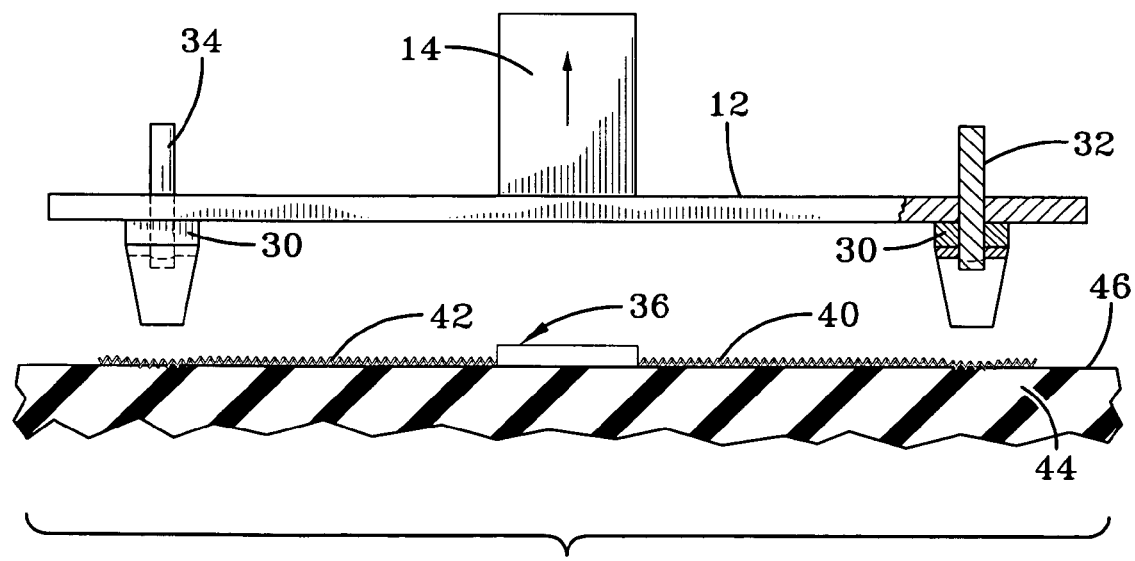
FIG. 6F is a side elevation view of the RFID device deposited on the receiving surface and withdrawn RFID handling apparatus.

With reference to FIGS. 6A-6F, operation of the tag handling apparatus 10 will be explained. FIG. 6A illustrates alignment of the apparatus 10 with a target tag 36. Antenna ends 40, 42 of the tag 36 extend in a straight line and are aligned opposite a respective guide component 16, 18 and the slot 24 defined thereby. The magnets within each slot 24 are preferably electromagnets that may be switched on as seen in FIG. 6B to attract the ferromagnetic antenna coil ends 40, 42. Permanent magnets may be employed if desired to attract the antenna coil ends 40, 42 into the slots 24 or a vacuum system may be used. The guide fingers, 20, 22 defining each tapered slot 24 are preferably composed of a non-ferromagnetic material and function to guide the antenna coil ends into the slot under influence of magnets 30.

As shown in FIG. 6C, the progress of antenna coil ends 40, 42 within their respective slots is terminated as the antenna ends encounter the remote ends of push rods 32, 34 within the slots. The guide fingers 20, 22 defining each slot 24 are arranged and aligned to ensure desired straightness of the dipole antenna is maintained. The guides are arranged to pick the dipole antenna at the ends 40, 42 and the antenna coil at each end is forced to a straight co-axial position fixed by the supporting structure 12.

The picking fingers 20, 22, once having secured the tag, can then place the tag at a desired location on surface 46 of receiving body 44. Relocation may be either effected manually or by using suitable conventionally available robotics or other automation techniques. FIG. 6D shows location of the apparatus 10 against a target surface 46. For a tire application, the target surface 46 may be a rubber component of the tire onto which the tag is to be secured. Once placed in a suitable location, the magnet is switched off to release the antenna coil. The fingers 20, 22 can press the coil (FIG. 6E) into the receiving compound with the assistance of the internal push rods 32, 34. If a permanent magnet is used within the slots 24, push rods 32, 34 may mechanically overcome the magnetic attraction to cause the antenna coil ends to exit their respective slots. The apparatus is removed as shown in FIG. 6F and the tag may then be covered with a secondary component (not shown). If a vacuum system (not shown) is used to attract the antenna ends into their respective slots 24, the vacuum may be removed. A force such as air pressure may thereupon be applied if desired to assist in removal of the antenna ends from the slots.

From the foregoing, it will be appreciated that the subject invention provides an automated or assisted apparatus to handle electronic devices having dipole coil antennas. The antenna is maintained in a desired straight condition while and after placing the antenna on a target surface. A tangled or bent antenna is captured within the slots and returned to a straight orientation for placement on the target surface. The apparatus can function to pick and capture a tag despite the small size of the tag and the potential for tangling in the tag antenna. While described above as picking the electronic device by means of engaging antenna ends, the apparatus 10 may be configured to act on the circuit board portion of the electronic device such as by applying a vacuum to the center circuit board component. The electronic device may then be moved so that the antenna ends enter into slots 24 and are maintained in their intended orientation as the electronic device is moved.

Figure 7:
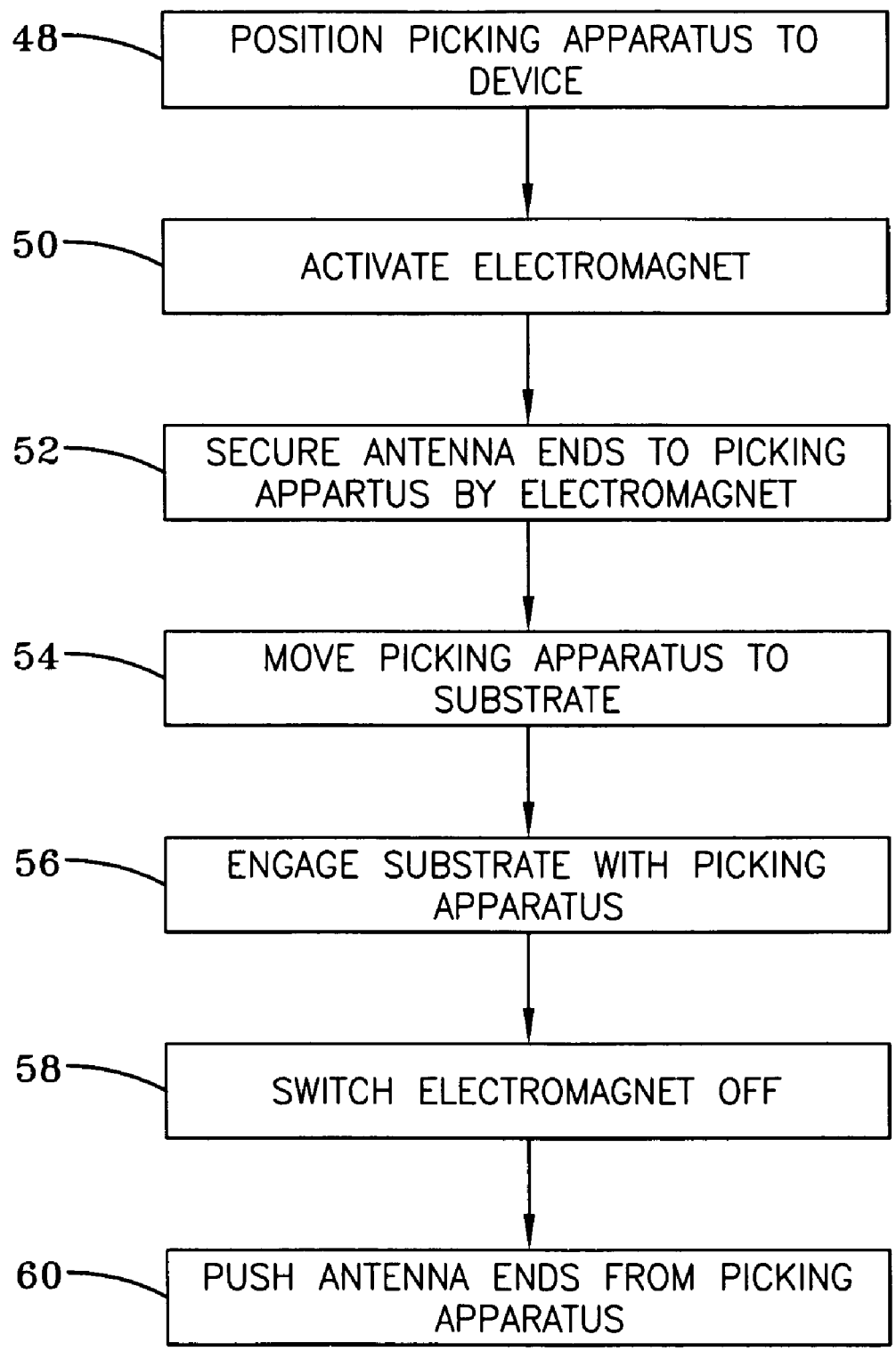
FIG. 7 is a block diagram illustrating the method of operation of the subject picking apparatus.

From FIG. 7, the methodology for affixing an electronic device such as the RFID to a substrate surface is illustrated in block diagram form. The picking apparatus 10 is positioned opposite to the electronic device (48). The magnet(s) 30 are switched on (50) to secure the device antenna ends to the picking apparatus (52). The apparatus 10 with the electronic device is then moved to the substrate (54) or, alternatively, the substrate may be presented to the apparatus 10. The picking apparatus engages the substrate (56) and the electromagnet(s) is switched off (58). While preferably separate electromagnets are deployed, one for each slot, more or fewer electromagnets may be employed if desired and arranged within the slot 24 or, alternatively external of the slot 24. The purpose of the magnet(s) is to influence the antenna ends 40, 42 into a captured relationship with the picking apparatus 10. In a broad sense, therefore, the invention contemplates means for drawing the antenna ends 40, 42 into their respective slots. Thereupon, the electronic device is deposited upon the substrate and a pushing apparatus component 32, 34 may be employed to influence the ends of the antenna onto or into the substrate 44. See discussion above of FIGS. 6A-6B. The apparatus 10 may be withdrawn and another cycle initiated.

It will be understood, therefore, that the subject method safely, expediently, and in a cost effective manner incorporates an electronic device, such as an RFID tag, having a dipole helically wound antenna into a tire surface. The method is capable of handling a tag individually and further is capable of picking a tag from a bin or tray and incorporating the tag into or on a distanced substrate during or post tire manufacture. The procedure functions to maintain the elongation of the antenna in a straight alignment and at its designed length between the picking and placement stages of the manufacturing procedure. Should the antenna be slightly bent when picked by the apparatus, the apparatus 10 will serve to straighten the antenna by drawing ends of the antenna into aligned slots within apparatus 10.

Variations in the present invention are possible in light of the description of it provided herein. While certain representative embodiments and details have been shown for the purpose of illustrating the subject invention, it will be apparent to those skilled in this art that various changes and modifications can be made therein without departing from the scope of the subject invention. It is, therefore, to be understood that changes can be made in the particular embodiments described which will be within the full intended scope of the invention as defined by the following appended claims.

What is claimed is:

1. Apparatus for handling an electronic device of the type having an elongate dipole antenna, comprising:
   a picking apparatus comprising a support body having an open slot on each of first and second opposite ends of the support body, each slot defined by opposite guide fingers;
   antenna positioning means positioned within each slot for moving opposite first and second antenna ends into a respective slot and holding the antenna end within a respective slot in an elongate condition; and
   pushing means within each of the slots for pushing each of the ends of the antenna from a respective slot.

2. Apparatus according to claim 1, wherein the antenna positioning means switches to an off condition to allow removal of the antenna from the slot.

3. Apparatus according to claim 1, wherein the apparatus further comprises actuation means actuating the pushing means for engaging and pushing the antenna ends from respective slots.

4. Apparatus according to claim 3, wherein the pushing means comprises a reciprocating push rod disposed to axially move a rod end into engagement with a respective antenna end and push the antenna end within the slot.

5. Apparatus according to claim 3, wherein the pushing means pushes the respective antenna end a sufficient distance to deposit the antenna end on a receiving component external of the slot.

6. Apparatus according to claim 1, wherein the guide fingers are composed of non-ferromagnetic material.

7. Apparatus according to claim 1, wherein the opposite guide fingers converging from an open slot end to a relatively narrower slot portion.

8. Apparatus according to claim 7, wherein the pushing means moves a respective antenna end from the open slot end to the narrower slot portion.

9. Apparatus according to claim 8, wherein the pushing means engages and pushes a respective antenna end from the narrower slot portion.

10. Apparatus according to claim 9, wherein the pushing means pushes the respective antenna end a sufficient distance to move the antenna end beyond the open slot end.

11. Apparatus according to claim 1, wherein the slots defined by the opposed fingers are aligned to receive a respective end of the dipole antenna therein and maintain the dipole antenna ends in a substantially co-linear orientation.

12. Apparatus according to claim 11, wherein the antenna positioning means is positioned to move the respective antenna end into the slot.

13. Apparatus according to claim 12, wherein the opposed guide fingers defining each slot converge from an open slot end to a relatively narrower slot portion.

14. Apparatus according to claim 13, wherein the antenna positioning means moves the respective antenna end into the open slot end to the narrower slot portion.

15. Apparatus according to claim 14, wherein the pushing means within each slot is operative to engage and push the respective antenna end from the narrower slot portion.

16. Apparatus according to claim 12, wherein the antenna positioning means comprises at least one magnet.

17. Apparatus according to claim 16, wherein the magnet is at least one electromagnet.

18. Apparatus according to claim 12, wherein the antenna positioning means is selected from a group of systems including: magnet systems.

* * * * *